United States Patent [19]

Titch et al.

[11] Patent Number: 4,783,266

[45] Date of Patent: Nov. 8, 1988

[54] FILTER FOR REMOVING PARTICLES FROM A FLUID, AND METHOD THEREFORE

[76] Inventors: DuWayne E. Titch, 17022 E. El Pueblo Blvd., Fountain Hills, Ariz. 85268; Joseph W. Titch, 17402 N. 40th Pl., Phoenix, Ariz. 85032

[21] Appl. No.: 83,436

[22] Filed: Aug. 10, 1987

[51] Int. Cl.⁴ ............................................. B01D 35/06
[52] U.S. Cl. .................................. 210/695; 210/130; 210/223; 210/435; 210/456
[58] Field of Search .................... 209/214, 215, 223.1, 209/232; 210/130, 222, 223, 232, 247, 435, 446, 456, 695, 248; 55/3, 100

[56] References Cited

U.S. PATENT DOCUMENTS

| | | | |
|---|---|---|---|
| 3,372,807 | 3/1968 | Barnard | 210/223 X |
| 3,834,539 | 9/1974 | Thompson | 210/223 X |
| 4,036,758 | 7/1977 | Combest | 210/223 |
| 4,067,810 | 1/1978 | Sullivan | 210/223 |
| 4,379,052 | 4/1983 | Stearns | 210/695 X |
| 4,440,639 | 4/1984 | Galuska | 210/222 X |
| 4,446,019 | 5/1984 | Robinson | 210/223 |

Primary Examiner—Richard V. Fisher
Assistant Examiner—W. Gary Jones
Attorney, Agent, or Firm—Harry M. Weiss

[57] ABSTRACT

A filter for removing particles from the fluid of a coolant or other fluid circulation system. The filter comprises a magnetic element to remove magnetic and charged or ionized non-magnetic particles, a plurality of filtering screens to remove particles larger than a selected size, and a filter by-pass system to allow the fluid to continue circulating on through the filter when the screens become impermeable.

6 Claims, 1 Drawing Sheet

FILTER FOR REMOVING PARTICLES FROM A FLUID, AND METHOD THEREFORE

FIELD OF THE INVENTION

This invention relates to filters and filtering methods, and more particularly, to filters and filtering methods for use in filtering out particles over a selected size, charged or ionized particles, or ferrous metal particles from a fluid, such as for fluids in engine radiators, wherein ferrous metal, particles over a selected size, and charged or ionized non-magnetic particles are removed.

BACKGROUND OF THE INVENTION

A major part of an internal combustion engine's coolant system is the coolant evaporator, e.g., a radiator found in an automobile. After a liquid coolant has passed through an engine and absorbed heat, it is sent through the evaporator for dissipation of the heat to the outside air. Channels in the evaporator, through which the coolant passes, are built very small in order to encompass a small quantity of heated coolant with a large quantity of air, thus dissipating the heat rapidly. As the coolant passes through the evaporator, it carries magnetic, and non-magnetic, particles which have eroded from the engine. This problem is more often found in older model cars which have experienced substantial use. Since the evaporator or radiator channels are small, the particles get lodged, and eventually stop the flow of coolant and shut down the cooling system.

The problem of blockage due to particle build-up also occurs frequently in industrial machinery heat exchange systems and water cooled air conditioning systems. Other fluid circulation systems which carry suspended particles also experience problems of system blockage due to particle build-up.

Although some prior filtering apparatus have been produced to try and resolve the problem, they fail to remove the larger portion of particles without clogging the apparatus and stopping the fluid flow. When the fluid can no longer pass through the filter, the cooling system, or other fluid circulation system, shuts down causing substantial damage to the affected machinery. There is, therefore, a need for an improved filter and filtering method which removes the undesired magnetic and non-magnetic particles, or particles larger than a selected size, from the coolant or filtered fluid without the threat of blocking the flow of fluid.

BRIEF SUMMARY OF THE INVENTION

It is therefore an object of the present invention to provide an improved filtering apparatus which filters particles over a selected size, magnetic, and charged or ionized nonmagnetic particles suspended in a fluid to be filtered.

It is another object of the present invention to provide a magnetic element within the apparatus to magnetically remove particles from the fluid when the particles are magnetic.

It is further an object of the present invention to provide, within the apparatus, a filter by-pass system for use when the filters are clogged and impermeable.

An additional object of the present invention is to incorporate into a single, inexpensive unit the features of the filter outlined in the above three objects. This unit could be attached in line with the coolant or other fluid circulation systems to remove particles suspended in the fluid. The top of the unit is detachable so that the filters may be removed and cleaned for continual use after clogging has occurred. A magnetic element in the bottom of the unit is also removable for cleaning purposes.

These, and other, objects, features, and advantages of the present invention, hereinafter disclosed, will become more apparent from the following, more detailed, description of the present invention with reference to the accompanying drawings.

DESCRIPTION OF THE PREFERRED EMBODIMENT

Figure 1:
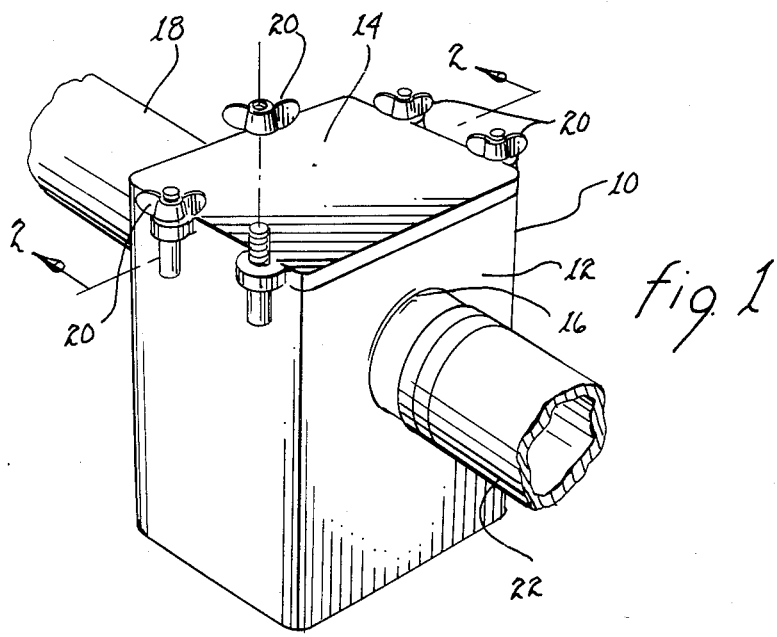
FIG. 1 is a front elevational view of the fluid filter attached to fluid circulation hoses.

Referring in particular to the drawings, FIG. 1 illustrates a fluid filter 10 which generally removes magnetic and charged or ionized non-magnetic particles, and particles larger than a selected sized, from a coolant or other fluid circulation system. In its preferred embodiment, the outer members of fluid filter 10 comprise a housing 12 with a top portion 14 of said housing 12, an inlet aperture 16 and opposing outlet aperture 18, and a sealing means 20 for removably sealing the top portion 14 to the housing 12. The housing 12 and the top portion 14 are constructed of rigid material capable of containing a heated fluid as it circulates through the filter 10. The sealing means 20, in its preferred embodiment, may consist of a combination of bolts fixedly attached to the outer sides of housing 12 and removably sealing top portion 14 to housing 12 with wing nuts (see FIG. 2), a spear lock, or any other appropriate means for sealing top portion 14 to housing 12.

Figure 3:
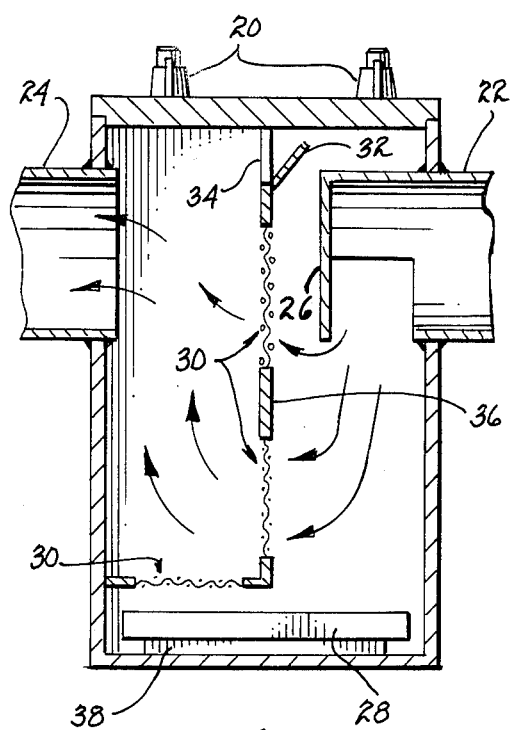
FIG. 3 is a cut-away view of the fluid filter taken along line 3—3 of FIG. 2.

An inlet hose connector 22 and an outlet hose connector 24 are fixedly inserted into inlet aperture 16 and outlet aperture 18 respectively, as shown in FIG. 3. A person skilled in the art of coolant systems will recognize that hose connectors 22 and 24 are conveniently constructed such that hoses, such as radiator hoses, may be clamped onto the connectors in conventional fashion.

FIG. 3 illustrates the general direction of flow of the fluid as it passes through the fluid filter 10 and the appropriate parts for directing the flow. Inlet hose connector 22 comprises a generally vertical inlet baffle 26 at its inward end, and may extend a short distance into container 12. The bottom portion of inlet hose connector 22 is preferably open to allow the inlet baffle 26 to divert the fluid down through the open bottom portion and into housing 12. The downward flow generally passes the fluid across a magnetic element 28 and through a plurality of screens 30.

The magnetic element 28 may be a magnetically charged material acting as a continuous magnet, an electromagnet, or other appropriate means to magnetically attract ferrous and other magnetic and charged or ionized non-magnetic types of material. The magnetic element 28 is removably elevated slightly above the bottom of the housing 12 by supports 38 to enable the fluid to completely encompass the magnetic element 28.

Figure 2:
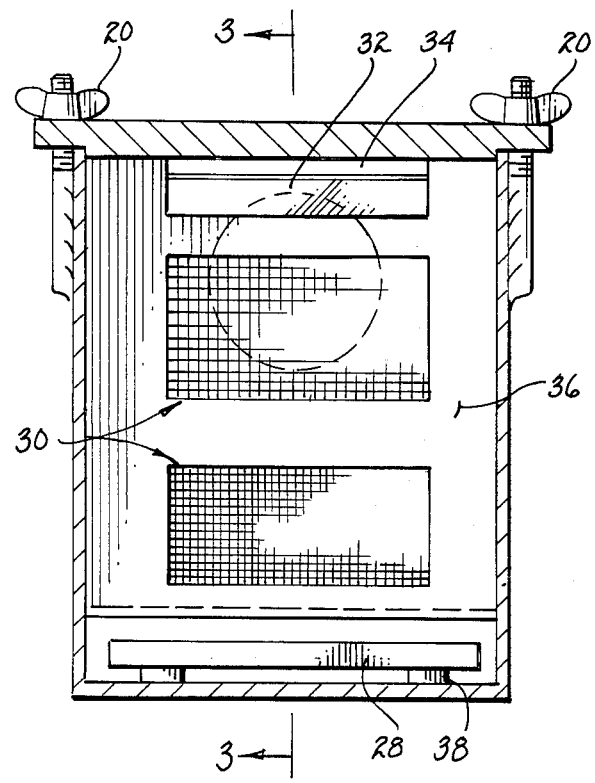
FIG. 2 is a cut-away view of the fluid filter taken along line 2—2 of FIG. 1.

The plurality of screens 30 comprises meshed materials of various permeability as illustrated in FIG. 2. The plurality of screens 30 are fixedly inserted in apertures of a filter plate 36. Filter plate 36 is removably attached to the inner walls of housing 12 by a means for removably attaching the filter plate 36 to the inner walls of housing 12, such as supports and braces.

A by-pass baffle 32 generally acts in conjunction with inlet baffle 26 to divert the fluid down across the magnetic element 28 and through the plurality of screens 30. However, if the plurality of screens 30 become impermeable due to collection on the screens of solid particles carried by the fluid, the fluid flows around the by-pass baffle 32 and through a by-pass aperture 34. In its preferred embodiment, by-pass aperture 34 may be located in the filter plate 36 above the plurality of screens 30. By-pass baffle 32, in its preferred embodiment, may be located between plurality of screens 30 and by-pass aperture 34. After the fluid has passed through the plurality of screens 30, or the by-pass aperture 34, it flows through outlet aperture 18 for recirculation through the coolant or fluid circulation system.

When the plurality of screens 30 become impermeable due to an accumulation of solid particles, the top portion 14 may be detached and the filter plate 36 may be removed from the housing 12 to discard the solid particles from off the plurality of screens 30. The magnetic element 28 may also be removed from off the supports 38 to remove magnetically attracted particles which have collected on the magnetic element 28. When the magnetic element 28 and filter plate 36 are replaced in their appropriate locations, and the top portion 14 resealed onto housing 12, the fluid filter 10 is once again in full operational mode.

In operational mode, the fluid filter 10, in its preferred embodiment, is connected to the coolant or other fluid circulation system such that the fluid must circulate through the filter 10 and deposit the particles suspended in the fluid into the filter 10. When the plurality of screens 30 become impermeable due to an accumulation of particles, and the operator desires to remove the particles, the circulation system preferably should be stopped, and, where the filter 10 is used in a coolant system, the fluid allowed to cool, before the filter plate 36 is removed. If the fluid circulation system must continue to operate after the plurality of screens 30 become impermeable, the fluid will flow through the by-pass aperture 34 and carry the particles on through the circulation system as if filter 10 were not attached.

It can be seen, therefore, that the present invention provides an apparatus which filters particles from a fluid in a coolant or other fluid circulation system and allows for continuous flow of the fluid through a by-pass system when the filtering system of the apparatus becomes impermeable. This apparatus, in accordance with the preferred embodiments, meets and achieves the objects and advantages set forth herein. The invention has been particularly described and illustrated with reference to certain embodiments, but the invention is not intended to be strictly limited to these embodiments. Those having ordinary skill in the art will recognize that variations and modifications differing from these embodiments, but falling within the spirit and scope of the invention, are possible. Other materials or configurations, for example, are contemplated by the present invention. All such variations and modifications as fall within the appended claims are therefore considered within the scope of the invention.

I claim:
1. A method for removing particles from a fluid in a fluid circulation system, said method comprising the steps of:
   passing said fluid into a housing, said housing comprising a magnetic element, a plurality of filtering screens, and a filter by-pass system;
   an inlet baffle in conjunction with a by-pass baffle diverting said fluid such that said fluid circulates across said magnetic element to remove magnetic and charged or ionized particles from said fluid, and through said plurality of filtering screens to remove particles suspended in said fluid until said filtering screens becomes impermeable due to an accumulation of solid particles;
   said inlet baffle and said by-pass baffle diverting said fluid to completely circulate across said magnetic element and through said filter by-pass system when said plurality of filtering screens become impermeable; and
   circulating said fluid from said plurality of filtering screens and said filter by-pass system out of said housing and back into said fluid circulation system.

2. A method for removing particles from a fluid according to claim 1, wherein said method removes magnetic particles, charged or ionized particles, and particles larger than a designated size from the coolant system of an internal combustion engine.

3. A filter for removing particles from a fluid in a fluid circulation system, said filter comprising:
   a housing;
   magnetic filter means located within said housing for removing magnetic and charged or ionized non-magnetic particles from said fluid;
   screen filter means located within said housing for filtering particles suspended in said fluid which are larger than a selected size;
   means including an inlet baffle and a by-pass baffle for diverting said fluid to circulate across said magnetic filtering means when said screen filter means becomes impermeable due to a build-up of particles from said fluid; and
   means located within said housing for allowing said fluid to by-pass said screen filter means when said screen filter means becomes impermeable. particles from said fluid.

4. A filter for removing particles according to claim 3, said housing comprising:
   a generally water-tight lower portion which is open at the top end of said lower portion;
   a top portion to removably cover and seal the top open end of said lower portion;
   a means for removably attaching and sealing said top portion onto the top open end of said lower portion;
   means defining a plurality of apertures in opposing sides of said lower portion, one of said apertures functioning as an inlet aperture and another of said apertures functioning as an outlet aperture;
   a plurality of hose connectors fixedly inserted into said plurality of apertures such that said hose connectors removably attach to hoses of said fluid circulation system, said hose connector inserted into said inlet aperture extending partially into said container and comprising said inlet baffle at the end of said hose connector and means defining an aperture on the bottom portion of said hose connector;

filter plate means for detachably engaging said screen filter means; and a means for removably attaching said filter plate means to the inner walls of said lower portion such that the top of said filter plate means does not extend above the top of said lower portion.

5. A filter for removing particles according to claim 3, wherein said filter by-pass means comprises:

means defining an aperture through which said fluid flows when said screen filtering means becomes impermeable; and the by-pass baffle extending from said aperture generally diagonal toward the inlet portion of said housing to divert said fluid down through said screen filtering means when said screen filtering means is permeable.

6. A filter for removing particles according to claim 3 wherein said screen filtering means comprises screens constructed of generally solid, meshed materials of varying permeability.

* * * * *